United States Patent [19]

Boutaghou

[11] Patent Number: 5,742,455
[45] Date of Patent: Apr. 21, 1998

[54] DUAL LATCH APPARATUS FOR RESTRAINING A DIRECT ACCESS STORAGE DEVICE ACTUATOR

[75] Inventor: Zine-Eddine Boutaghou, Owatonna, Minn.

[73] Assignee: International Business Machines Corporation, Armonk, N.Y.

[21] Appl. No.: 837,809

[22] Filed: Apr. 22, 1997

Related U.S. Application Data

[63] Continuation of Ser. No. 473,201, Jun. 7, 1995, abandoned.
[51] Int. Cl.⁶ .............................. G11B 5/54; G11B 21/22
[52] U.S. Cl. ............................................................ 360/105
[58] Field of Search .................................. 360/105

[56] References Cited

U.S. PATENT DOCUMENTS

| | | | |
|---|---|---|---|
| 3,631,419 | 12/1971 | Ho | 340/174.1 C |
| 4,725,907 | 2/1988 | Jue | 360/105 |
| 4,833,550 | 5/1989 | Takizawa et al. | 360/75 |
| 5,034,837 | 7/1991 | Schmitz | 360/105 |
| 5,189,576 | 2/1993 | Morehouse et al. | 360/105 |
| 5,208,713 | 5/1993 | Lindsay et al. | 360/105 |
| 5,296,986 | 3/1994 | Morehouse et al. | 360/106 |
| 5,369,538 | 11/1994 | Mos et al. | 360/105 |

FOREIGN PATENT DOCUMENTS

| | | |
|---|---|---|
| 62-287475 | 12/1987 | Japan . |
| 3-259479 | 11/1991 | Japan . |
| 4-26968 | 1/1992 | Japan . |
| 4-305879 | 10/1992 | Japan . |
| 5-182347 | 7/1993 | Japan . |

OTHER PUBLICATIONS

IBM Technical Disclosure Bulletin, A Bistable, Zero Steady-State Power, Rotary-Actuator Lock for DASD, vol. 36, No. 3, Mar. 1993, pp. 7-10.

*Primary Examiner*—Robert S. Tupper
*Attorney, Agent, or Firm*—Mark A. Hollingsworth; Tyler L. Nasiedlak; Matthew J. Bussan

[57] ABSTRACT

A dual latch apparatus disposed in a direct access storage device for restraining a rotatably mounted actuator in a parked orientation in the presence of relatively low, moderate, and high levels of externally induced actuator acceleration is disclosed. An inertial latch assembly in preferably employed to prevent unrestrained actuator rotation from the parked orientation that would otherwise result from elevated levels of externally induced actuator acceleration. A separate magnetic latch assembly, or, alternatively, an electromagnetic latch assembly, is employed in tandem with the inertial latch assembly to prevent unrestrained actuator rotation and movement from the parked orientation in the presence of relatively low and moderate levels of externally induced actuator acceleration. The novel dual actuator latch apparatus is amenable for installation in standard form factor DASDs, and is particularly well-suited for incorporation in small and very small form factor DASDs.

15 Claims, 6 Drawing Sheets

DUAL LATCH APPARATUS FOR RESTRAINING A DIRECT ACCESS STORAGE DEVICE ACTUATOR

This is a Continuation of application Ser. No. 08/473, 201, filed Jun. 7, 1995 now abandoned.

FIELD OF THE INVENTION

The present invention relates generally to data storage systems, and more particularly, to a dual actuator latch apparatus for use in a direct access storage device.

BACKGROUND OF THE INVENTION

In the data storage system manufacturing industry, various methods have been employed to minimize the detrimental influence of strong external rotational shock forces on the operation of the sensitive components comprising a direct access storage device (DASD). A typical DASD includes one or more data storage disks coaxially mounted on a hub of a spindle motor. The spindle motor rotates the disks at speeds typically on the order of several thousand revolutions-per-minute. Digital information is typically written to and read from the data storage disks by one or more magnetic transducer heads, or read/write heads, which are passed over the surfaces of the rotating data storage disks.

An actuator typically includes a plurality of outwardly extending actuator arms adapted to interleave one or more magnetic transducer heads mounted thereon into and out of the stack of data storage disks. During periods of DASD inactivity, the actuator is often restrained in a predetermined parked position by use of a passive locking or parking mechanism, such as a parking ramp apparatus, for example. The magnetic transducer heads are usually parked beyond the outer periphery of the data storage disks or over a dedicated portion of the disk surface, often termed a landing zone, situated away from the data storing portions of the disk.

Mishandling of either the DASD or a computer system into which the DASD is installed often results in displacement of the actuator from its parked position. Such direct and indirect mishandling often subjects the sensitive internal components of the DASD to significantly large rotational shock forces. The rotatably mounted actuator is generally susceptible to rotational forces and often rotates out of the parked position when the DASD is subjected to a sufficiently strong rotational shock force. Unrestrained movement of the actuator typically results in varying degrees of permanent damage to the sensitive surfaces of the data storage disks and to the magnetic transducers. A damaged region of the disk is generally unusable for subsequent storing of data. Also, any data stored at the damaged location may be irreparably lost.

Various methods and apparatus have been developed to reduce the potentially catastrophic results of unrestrained actuator rotation out of a preferred parked orientation during periods of DASD inactivity. In general, conventional latching mechanisms are designed to counteract detrimental actuator rotation within a limited range of acceleration. It is known in the art, for example, that commonly used inertial latching assemblies are generally effective for limiting unrestrained actuator rotation in the presence of high levels of externally induced actuator acceleration. It is also known in the art that commonly used magnetic or electromagnetic latch assemblies are generally effective for limiting such unrestrained actuator rotation in the presence of low levels of externally induced actuator acceleration.

A typical inertial latching assembly is designed to passively latch an actuator in a parked orientation until external rotational shock forces impinging the DASD are dissipated. Known inertial latches are typically mounted for rotation about a pivot axis in proximity to the actuator, and include a weighted portion and hook portion. In response to a sufficiently strong rotational shock force applied to the DASD, the hook portion of the inertial latch typically rotates about the pivot axis and engages a receiving hook or other capturing member protruding from the actuator. A biasing mechanism is generally employed to return the inertial latch to its original, non-engaged orientation after the external shock forces are dissipated.

Inertial latching mechanism are generally effective only at relatively high levels of externally induced actuator acceleration. Elevated levels of actuator acceleration must generally be present in order to overcome the force produced by the biasing mechanism required to maintain the inertial latching mechanism in its non-engaged orientation. Low to moderate levels of induced actuator accelerations are therefore not generally addressed when designing a conventional inertial latching mechanism.

In contrast, magnetic or electromagnetic latching mechanisms are generally effective only at relatively low levels of externally induced actuator rotational acceleration. In accordance with a conventional magnetic-type latching device, a magnetic coupling force of limited range is generally produced between the latching device and the actuator to restrain the actuator in an engaged or latched orientation. It is generally considered impractical to employ a magnetic-type latching device to counteract relatively high levels of externally induced actuator rotational acceleration. The intensity of the magnetic coupling force required to satisfactorily restrain a rotatable actuator in the presence of such high acceleration levels would typically require application of an excessively large force to free the actuator from the magnetic latch prior to initiating normal operation, and would likely interfere with the efficient operation of the actuator voice coil motor and other DASD operations. Also, electromagnetic latching mechanisms that employ a solenoid would require delivery of an appreciable amount of current to the solenoid in order to de-couple the latching device from the actuator. Such solenoids would generally be significantly larger than solenoids used in low-acceleration type electromagnetic latches, and would typically occupy an unacceptable amount of space within the relatively compact housing configurations of present and future small form factor DASDs.

A trend has developed in the DASD manufacturing community to miniaturize the chassis or housing of a DASD to a size suitable for incorporation into miniature personal computers, such as lap-top and hand-held computers, for example. Various industry standards have emerged that specify the external housing dimensions of small and very small form factor DASDs. One such recognized family of industry standards is the PCMCIA (Personal Computer Memory Card Industry Association) family of standards, which specifies both the dimensions for the DASD housing and the protocol for communicating control and data signals between the DASD and a host computer system coupled thereto. Recently, four families or types of PCMCIA device specifications have emerged. By way of example, a Type-I PCMCIA DASD must be fully contained within a housing having a maximum height dimension of 3.3 millimeters (mm). By way of further example, a Type-II PCMCIA device housing must not exceed a maximum height of 5.0 mm in accordance with the PCMCIA specification. A maximum height of 10.5 mm is specified for the housing of Type-III PCMCIA devices, and Type-IV devices are characterized as having a maximum housing height dimension in excess of 10.5 mm.

It is anticipated that the industry trend of continued miniaturization of DASDs will eventually result in the production of systems complying with the Type-II PCMCIA specification. Such Type-II PCMCIA DASDs will likely have external housing dimensions of approximately 54 mm×86 mm×5 mm, and include a data storage disk having a diameter of approximately 45 mm and a width dimension similar to that of a standard credit card. It will likely be highly desirable to employ an effective actuator latching assembly within such small and very small form factor DASDs, such as Type-II PCMCIA DASDs. Those skilled in the art, however, will appreciate the difficulties associated with employing an effective latching mechanism suitable for use within these very small form factor DASDs. The maximum allowable housing dimensions imposed by the Type-II PCMCIA specification, for example, necessarily results in a highly compact packaging configuration within the DASD housing, with minimal clearance and tolerances afforded between adjacent components.

Employment of prior art latching mechanisms within the compact environment of a small form factor DASD is generally considered problematic for a variety of reasons. A conventional inertial or magnetic-type latching mechanism generally occupies an appreciable amount of space within the compact DASD housing. More significantly, a conventional inertial or magnetic-type latching mechanism is generally effective within a relatively narrow range of externally induced actuator acceleration levels, thus rendering the actuator and other sensitive components of the DASD vulnerable to detrimental levels of induced acceleration outside the prescribed range. These and other characteristics of prior art actuator latching mechanisms generally represent significant limitations in the development and optimization of highly reliable, portable DASDs.

There exists within the DASD manufacturing community a need to provide effective protection against unrestrained actuator movement in the presence of a broad range of externally induced acceleration levels in order to minimize potential damage to the sensitive internal components of standard and miniaturized DASDs. There exists a further desire to incorporate the advantageous attributes of inertial and magnetic-type latching mechanisms within the compact packaging configurations of small and very small form factor DASDs. The present invention fulfills these and other needs.

SUMMARY OF THE INVENTION

The present invention is a dual actuator latch apparatus disposed in a direct access storage device for restraining a rotatably mounted actuator in a parked orientation in the presence of relatively low, moderate, and high levels of externally induced actuator acceleration. An inertial latch assembly in preferably employed to prevent unrestrained actuator rotation from the parked orientation that would otherwise result from elevated levels of externally induced actuator acceleration. A separate magnetic latch assembly, or, alternatively, an electromagnetic latch assembly, is employed in tandem with the inertial latch assembly to prevent unrestrained actuator rotation and movement from the parked orientation in the presence of relatively low and moderate levels of externally induced actuator acceleration. The novel dual actuator latch apparatus is amenable for installation in standard form factor DASDs, and is particularly well-suited for incorporation in small and very small form factor DASDs.

DETAILED DESCRIPTION OF THE PREFERRED EMBODIMENTS

Figure 1:
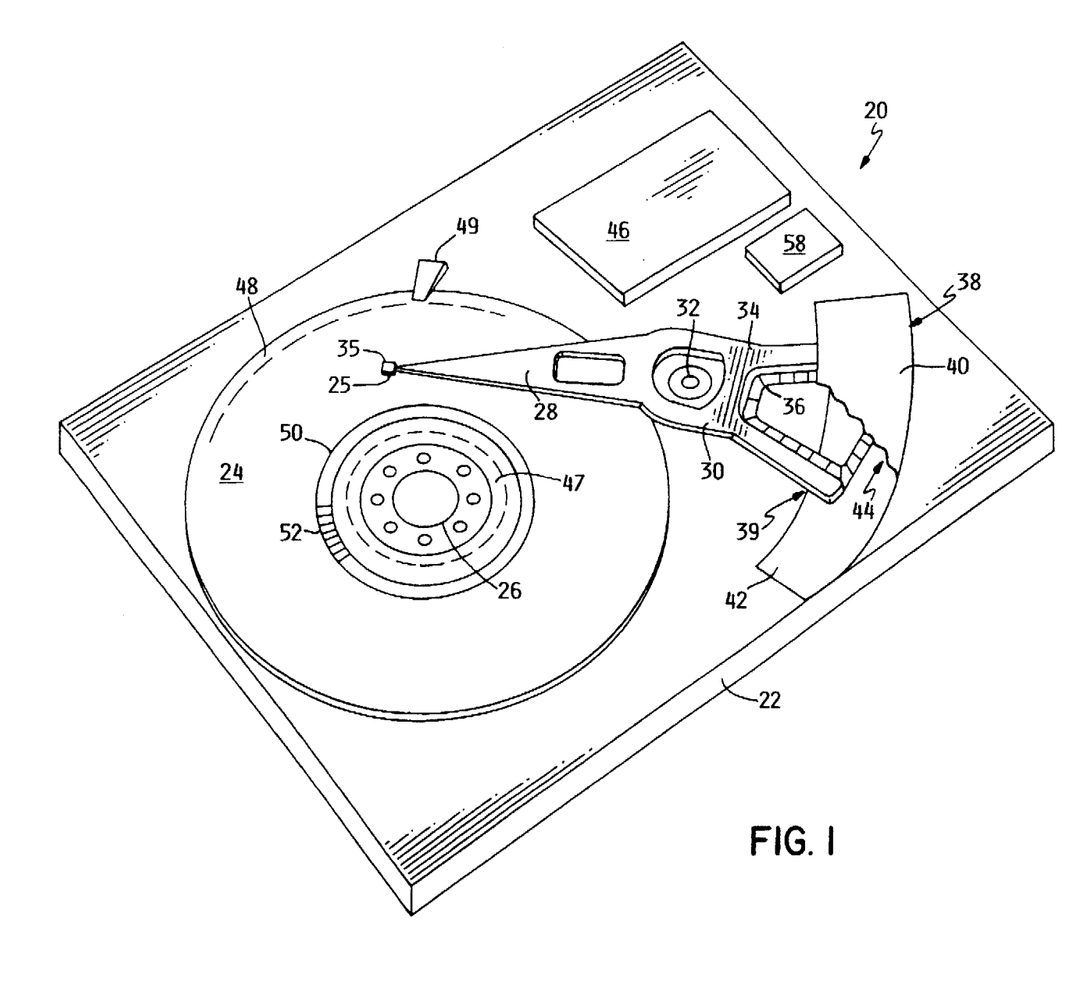
FIG. 1 is a top perspective view of a direct access storage device with its upper housing cover removed.

Referring now to the drawings, and more particularly to FIG. 1, there is shown a data storage system 20 with a cover 23 removed from the base 22 of the housing 21. A data storage system 20, as further shown in FIG. 2, typically includes one or more rigid data storage disks 24 which are stacked coaxially in a tandem spaced relationship, and rotate about a spindle motor 26 at a relatively high rate of rotation. Each disk 24 is typically formatted to include a plurality of spaced concentric tracks 50, with each track being segmented into a series of sectors 52 which, in turn, are further divided into individual information fields. One or more of the disks 24 may alternatively be formatted to include a spiraled track configuration.

Figure 2:
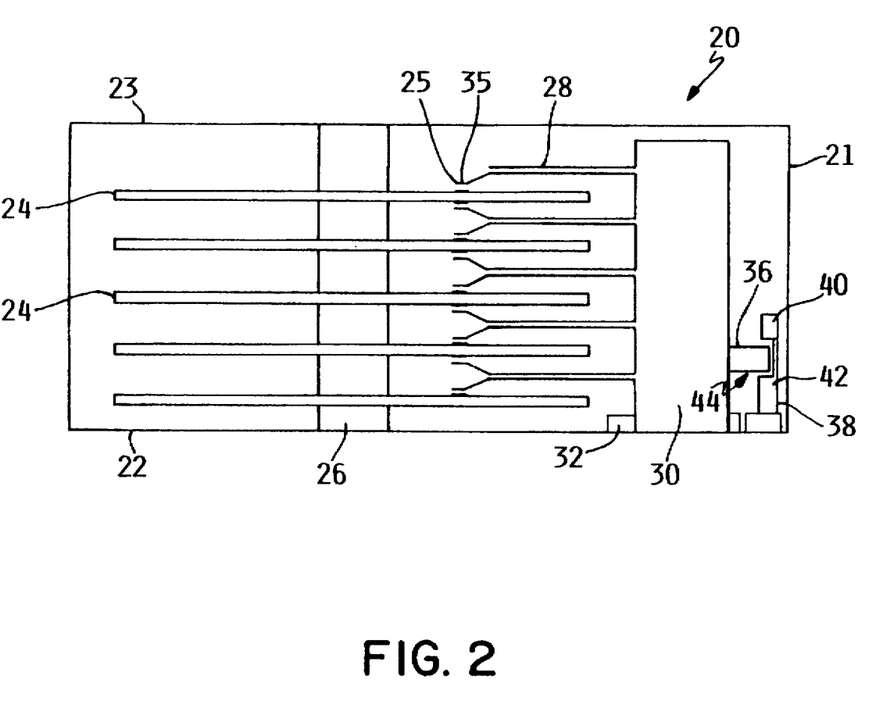
FIG. 2 is a side plan view of a direct access storage device comprising a plurality of data storage disks.

An actuator 30 typically includes a plurality of interleaved actuator arms 28, with each arm having one or more transducers 25 mounted to a slider 35 assembly for writing and reading information to and from the data storage disks 24. The slider 35 is typically designed as an aerodynamic lifting body that lifts the transducer 25 off of the surface of the disk 24 as the rate of spindle motor 26 rotation increases, and causes the transducer 25 to hover above the disk 24 on an air bearing produced by high-speed rotation of the disk 24. A conformal lubricant may alternatively be disposed on the disk surface 24 to reduce static and dynamic friction between the slider 35 and disk surface 24.

The actuator 30 is usually mounted to a stationary actuator shaft 32, and rotates on the shaft to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38, causing the actuator arms 28, in turn, to sweep over the surface of the data storage disks 24. The spindle motor 26 typically comprises a polyphase, d.c. motor or, alternatively, an a.c. motor, energized by a power supply 46 and adapted for rotating the data storage disks 24.

The coil assembly 36 and the upper and lower magnet assemblies 40 and 42 of the permanent magnet structure 38 operate in cooperation as an actuator voice coil motor responsive to control signals produced by a controller 58. The actuator voice coil motor produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34, in turn, cause corresponding rotational movement of the actuator arms 28 in directions dependent on the polarity of the control currents flowing in the coil assembly 36. A controller 58 preferably includes control circuitry that coordinates the transfer of data to and from the data storage disks 24, and cooperates with the actuator voice coil motor to move the actuator arms 28 and transducers 25 to prescribed track 50 and sector 52 locations when reading and writing data to and from the disks 24. It is noted that the data storage disks 24 may be formatted to store alphanumeric, audio, video, and other types of informational data, or a combination of data types.

Figure 3:
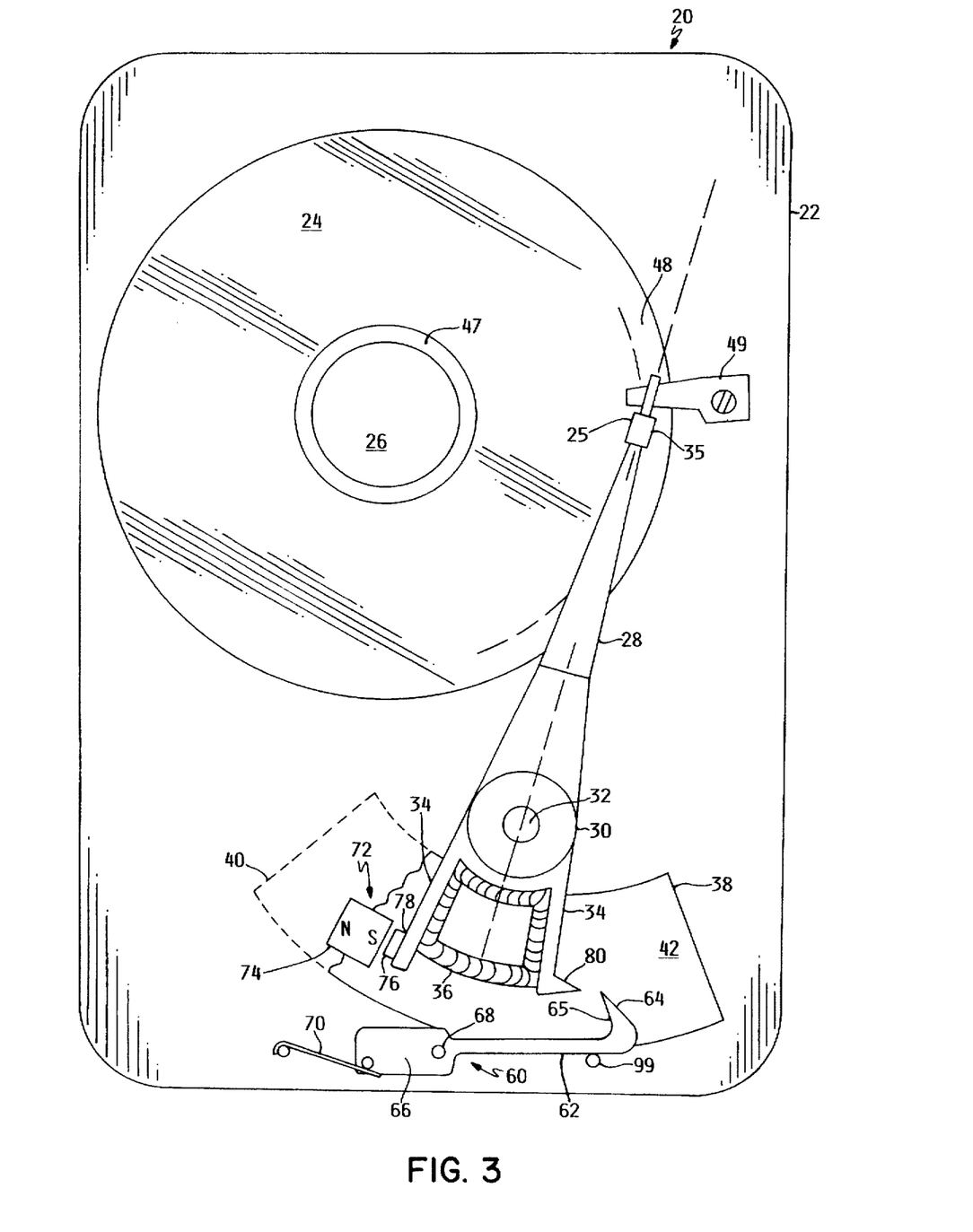
FIG. 3 is a top plan view of a direct access storage device employing a novel dual actuator latch apparatus comprising a magnetic latch assembly in combination with an inertial latch assembly.

Turning now to FIG. 3, there is illustrated one embodiment of a novel dual actuator latch apparatus that prevents unrestrained actuator 30 rotation out of a parked orientation in the presence of relatively weak, moderate, and strong external shock forces applied to the DASD housing 21. The novel dual actuator latch apparatus illustrated in FIG. 3 is preferably adaptable for installation in standard and small form factor DASDs. In one embodiment, the dual actuator latch apparatus is employed in a load/unload DASD, with the slider 35 and transducer 25 being unloaded from the disk 24 surface and loaded to a ramp 49 proximate the outer periphery of the disk 24. In an alternative embodiment, the dual actuator latch apparatus is employed in DASD having either one of an inner landing zone 47 or outer landing zone 48 defined respectively near the inner and outer periphery of the data storage disk 24. In accordance with this embodiment, the slider 35 and transducer 25 physically contact the surface of the disk 24 within either one of the inner or outer landing zones 47 and 48 when the actuator 30 is moved to a parked orientation.

In a load/unload DASD, the actuator 30 is generally moved toward the outer periphery of the disk 24 during a power-down procedure, with the actuator arm 28 typically engaging the ramp 49 to lift the slider 35 and transducer 25 off of the disk 24 surface. In the parked configuration illustrated in FIG. 3, the actuator 30 is preferably restrained from unintended movement by a magnetic coupling force produced between a permanent magnet assembly 74 and a surface of the actuator frame 34. An actuator stop surface 78 is preferably disposed on one side of the actuator frame 34 to magnetically interact with the permanent magnet assembly 74 coupled to the base 22 of the DASD housing 21. A magnetic assembly stop 76 is preferably mounted to the actuator frame 34 for contacting the permanent magnet assembly 74 when the actuator 30 is in an engaged or parked orientation. In an alternative embodiment, the magnetic assembly stop 76 may be mounted to the permanent magnet assembly 74 for contacting the actuator stop surface 78. The magnet assembly stop 76 is preferably configured to provide a constant clearance distance between the permanent magnet assembly 74 and the actuator stop surface 78 to enhance control of the nominal field strength associated with the permanent magnet assembly 74.

In an alternative embodiment, the permanent magnet structure 38 that magnetically interacts cooperatively with the actuator coil assembly 36 as a voice coil motor is preferably employed to produce the magnetic coupling force required to magnetically restrain the actuator 30 in the parked orientation. In accordance with this embodiment, the permanent magnet assembly 74 shown in FIG. 3 preferably comprises a ferromagnetic member 74 extending between the upper and lower magnet structures 40 and 42. Magnetic flux lines preferably circulate through a permanent magnet of one polarity disposed on the upper magnet assembly 40, through the member 74, and through a permanent magnet of the opposite polarity disposed on the lower magnet assembly 42 to complete the magnetic flux path. When the actuator stop surface 78 is in contact or in proximity with the ferromagnetic member 74, a relatively low reluctance pathway through which the magnetic flux lines pass is produced which, in turn, results in the production of the required magnetic coupling force.

It is generally well-known that a magnetic latch assembly 72 provides effective restraining of an actuator 30 in a preferred parked orientation in the presence of relatively low to moderate levels of externally induced actuator acceleration. It is also well-known that such magnetic latch assemblies 72 do not provide reliable restraining of the actuator 30 in the presence of elevated levels of externally induced actuator acceleration. The novel dual actuator latch apparatus illustrated in FIG. 3 remedies many of the inherent deficiencies associated with conventional actuator latching mechanisms by employing a separate inertial latch assembly 60 in tandem with a magnetic latch assembly 72 to provide highly reliable restraining of unintended actuator 30 movement or rotation in the presence of varied levels of externally induced actuator acceleration. As such, the novel dual actuator latch apparatus provides for virtually 100% restrainment reliability of a DASD actuator 30 in the presence of low, moderate, and high shock forces exerted on the DASD housing 21.

The inertial latch assembly 60 illustrated in FIG. 3 preferably includes an inertial latch body 62 rotatably mounted on a pivot shaft 68. The inertial latch body 62 preferably includes an elongated restraining member 64 and an inertial body 66. As shown in FIG. 3, the restraining member 64 is situated in proximity to a first engagement protrusion 80 disposed on one side of the actuator frame 34. When in a non-engaged orientation, as shown in FIG. 3, the restraining member 64 is maintained in a non-engagement orientation by a biasing apparatus 70 coupled to the inertial body 66, thus permitting unobstructed rotation of the actuator frame 34 within the gap 44 of the permanent magnet assembly 38. The biasing apparatus 70 preferably biases the inertial latch body 62 against a stop member 99 when the restraining member 64 is maintained in a non-engagement orientation. If the DASD is subjected to a sufficiently strong external rotational shock force, an unrestrained actuator arm 28 may rotate away from the parking ramp 49 or landing region 48 and cause the magnetic transducer head 25 and slider 35 to contact and damage the data storing regions of the data storage disk 24.

Unrestrained rotation of the actuator 30 away from the parked position resulting from a strong external rotational shock force is prevented by the inertial latch assembly 60 rotating from a non-engaged orientation to an engaged orientation with respect to the actuator 30. A sufficiently strong clockwise rotational shock force exerted on the DASD housing 21, for example, will generally dislodge the actuator 30 from its parked orientation, notwithstanding the magnetic coupling force between the permanent magnet assembly 74 and the actuator stop surface 78. The dislodged actuator arm 28 and slider 35/transducer 25 assembly will tend to rotate toward the motor spindle 26 in a counter-clockwise direction with respect to the system housing 21. The unrestrained rotation of the actuator 30 and transducer 25/slider 35 assembly will typically result in detrimental contact between the transducer 25/slider 35 assembly and the sensitive data storing regions on the data storage disk 24.

In response to a strong clockwise rotational shock force applied to the DASD housing 21, the inertial latch body 62 rotates in a counter-clockwise direction about the pivot shaft 68. The restraining member 64 engages the first engagement protrusion 80 disposed on one side of the actuator coil frame 34 to prevent unrestrained rotation of the actuator 30 out of the parked orientation. The inertia produced by the inertial body 66 as it rotates in a counter-clockwise direction overcomes the biasing force exerted by the biasing apparatus 70, thereby causing the restraining member 64 to rotate toward the first engagement protrusion 80 disposed on the actuator coil frame 34. The first engagement protrusion 80 is then captured by the restraining member 64, thus preventing the actuator 30 from rotating out of the parked position. After the strong clockwise rotational shock force exerted on the DASD housing 21 is dissipated, the biasing force produced by the biasing apparatus 70 and exerted on the inertial body 66 urges the restraining member 64 to rotate out of engagement with the first engagement protrusion 80, and causes the inertial latch body 62 to return to its original non-engaged orientation. The biasing apparatus 70 preferably comprises a spring coupled to the inertial body 66 or, alternatively, a torsion spring disposed on the pivot shaft 68 and coupled to the inertial latch body 62.

In the embodiment illustrated in FIG. 3, a strong counter-clockwise rotational shock force applied to the DASD housing 21 will generally cause an unrestrained actuator 30 to rotate in a clockwise direction with respect to the DASD housing 21. Any unrestrained clockwise rotation of the actuator 30 away from the data storing regions of the disk 24 is generally of secondary concern. The actuator stop surface 78 disposed on the actuator coil frame 34 is preferably in contact with the permanent magnet assembly 74 which prevents further rotation of the actuator arm 28 and the transducer 25/slider 35 assembly in a direction away from the motor spindle 26. The magnetic coupling force between the actuator stop surface 78 and the permanent magnet assembly 74 preferably provides for the secure restraining of the actuator 30 in the parked orientation in the event of residual bouncing or settling between the actuator coil frame 34 and the permanent magnet assembly 74.

Figure 4:
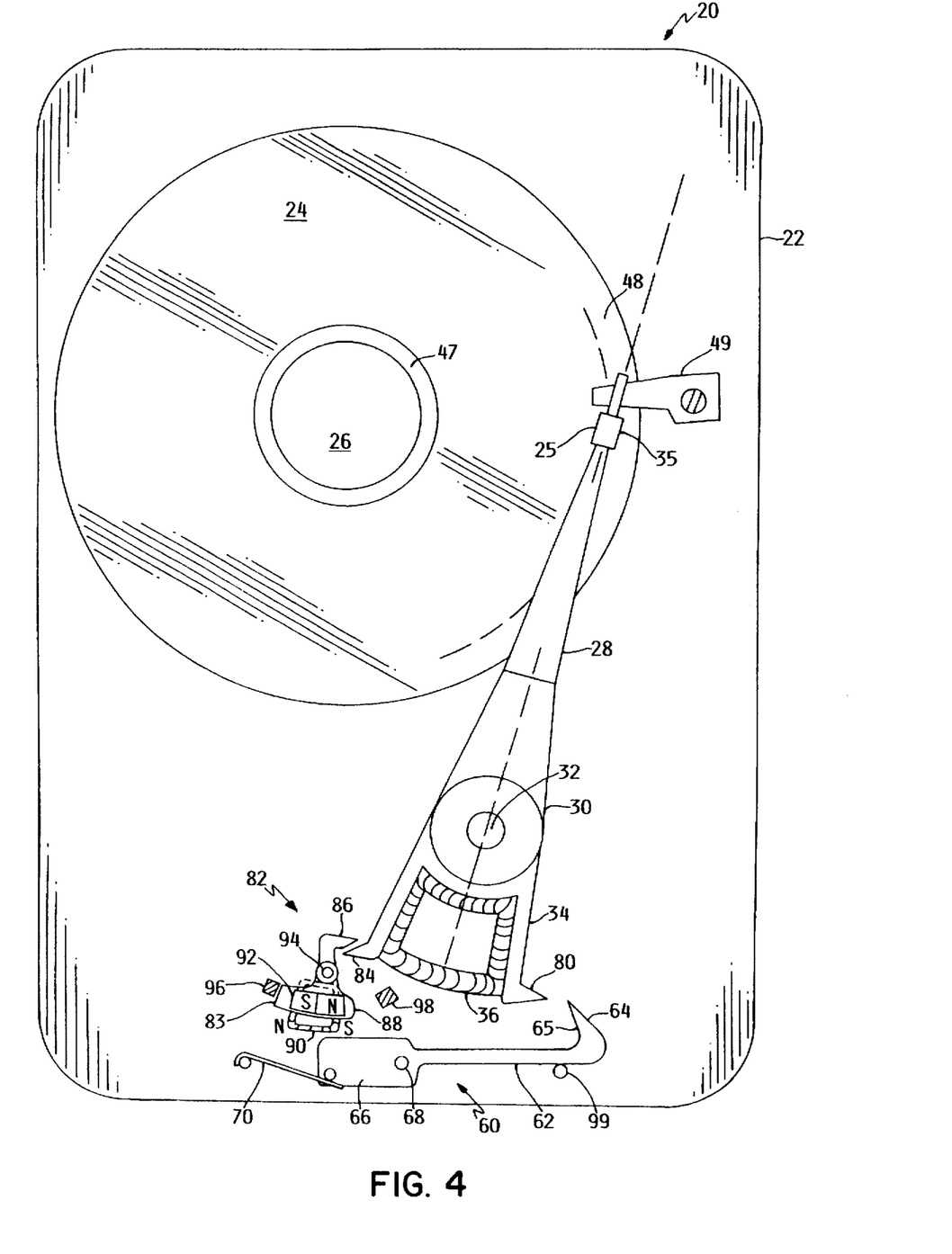
FIG. 4 is a top plan view of a direct access storage device employing a novel dual actuator latch apparatus comprising one embodiment of an electromagnetic latch assembly in combination with an inertial latch assembly.

Another embodiment of the novel dual actuator latch apparatus is illustrated in FIG. 4. The dual actuator latch apparatus illustrated in FIG. 4 preferably includes an inertial latch assembly 60 similar to that discussed previously with respect to FIG. 3, and an electromagnetic latch assembly 82. The electromagnetic latch assembly 82 preferably provides for reliable actuator restraining in the presence of relatively low to moderate levels of externally induced actuator accelerations and is preferably of a sufficiently small size suitable for use in small form factor DASDs.

The electromagnetic latch assembly 82 preferably includes an electromagnetic latch body 83 rotatably mounted to a pivot shaft 94 disposed on the base 22 of the DASD housing 21. The electromagnetic latch body 83 includes a magnet support 88 for supporting a permanent magnet 92, and a restraining member 86 for engaging and coupling with a second engagement protrusion 84 disposed on one side of the actuator coil frame 34. The electromagnetic latch assembly 82 further includes a latch coil 90 mounted to the base 22 or a flange support mounted to the base 22, and an engagement boss 96 and a release boss 98 also mounted to the housing base 21. When in an engaged configuration, as shown in FIG. 4, magnetic coupling between the permanent magnet 92, disposed on the magnet support 88, and the engagement boss 96 provides for secured coupling between the restraining member 86 and the second engagement protrusion 84 disposed on the actuator coil frame 34 in the presence of relatively low to moderate levels of externally induced actuator acceleration. The permanent magnet 92 disposed on the magnet support 88 preferably includes a south pole (S) segment for magnetically interacting with the engagement boss 96, and a north pole (N) segment for magnetically interacting with the release boss 98.

The engagement boss 96 and release boss 98 are preferably formed of a suitable ferromagnetic material which is magnetically attracted by the polar fringe fields associated with the south and north pole segments of the permanent magnet 92. The magnetic coupling force between the north pole segment and the release boss 98 is preferably less than the magnetic coupling force between with the south pole segment and the engagement boss 96. To achieve a desired magnetic coupling force differential, the relative separation distances respectively between the south and north pole segments and the engagement and release bosses 96 and 98 can be varied, for example. Modification to the shape and size of the south and north pole segments of the permanent magnet 92 may also provide for the desired force differential.

The electromagnetic latch body 83 is preferably rotated from an engaged orientation to a non-engaged orientation by increasing the magnet coupling force between the north pole of the permanent magnet 92 and the release boss 98 sufficient to rotate the magnet support 88 in a direction toward the release boss 98. Application of a current in the appropriate direction through the latch coil 90 provides means for rotating the magnet support 88 in a direction toward either of the release boss 98 or engagement boss 96. Application of a release current to the coil 90 to move the electromagnetic latch body 83 from the engaged orientation to the non-engaged orientation is preferably applied during the power-up procedure of the DASD. During a power-down procedure, application of a engagement current to the latch coil 90 is preferably provided by back EMF generated within the spindle motor 26 as the spindle motor 26 is powered down.

In the presence of relatively low to moderate levels of externally induced actuator acceleration, the magnetic coupling force between the permanent magnet 92 and the engagement boss 96 is preferably sufficient to restrain the actuator 30 in a parked and engaged orientation. Application of a strong external shock force exerted on the DASD housing 21 may be of sufficient magnitude to cause de-coupling between the second engagement protrusion 84 disposed on the actuator coil frame 34 and the restraining member 86 of the electromagnetic latch assembly 82. Detrimental unrestrained actuator 30 rotation, however, is precluded by concurrent actuation of the inertial latch assembly 60 which results in actuator restrainment preferably in a manner similar to that previously described with respect to FIG. 3.

Figure 5:
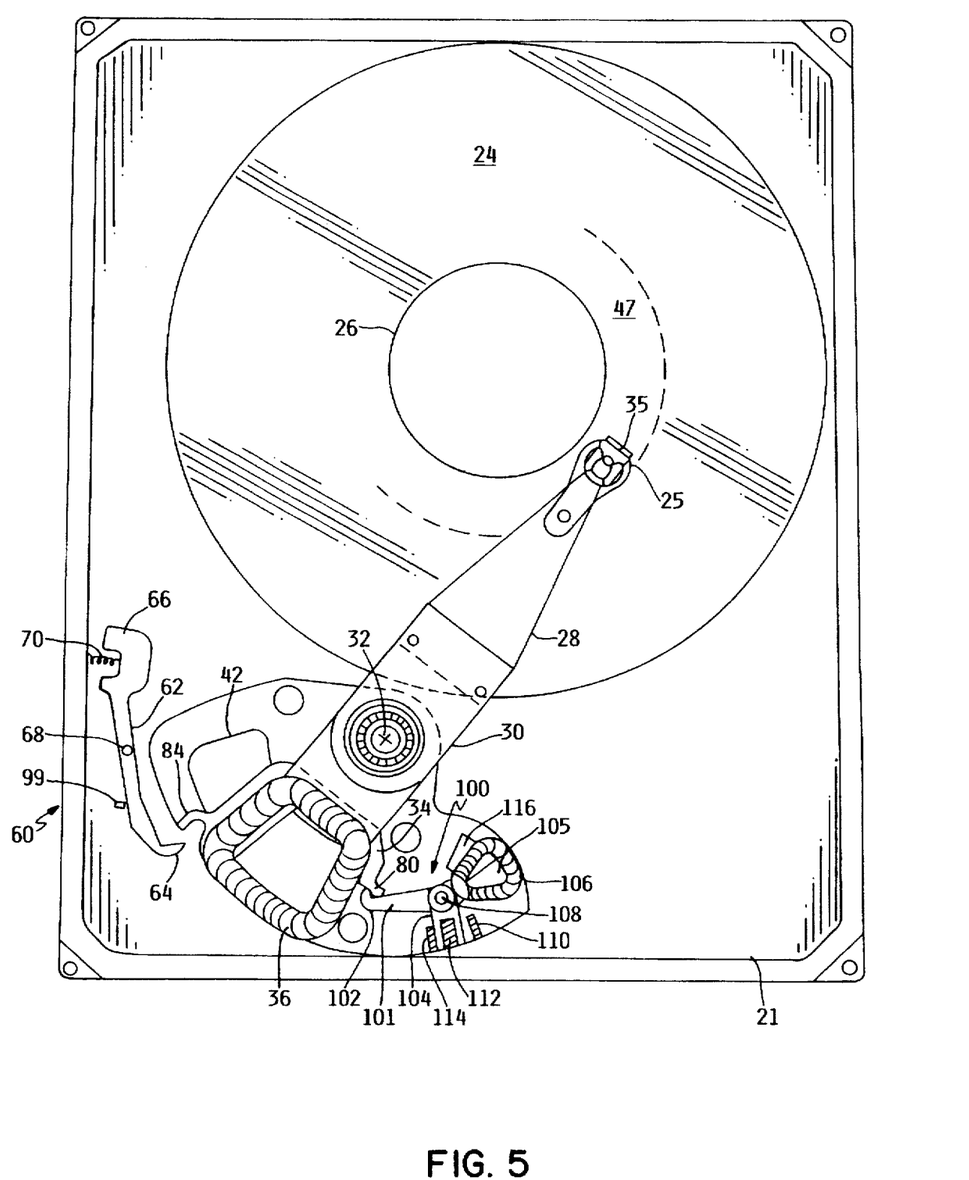
FIG. 5 is a top plan view of a small form factor direct access storage device employing a novel dual actuator latch apparatus comprising an alternative embodiment of an electromagnetic latch assembly in combination with an inertial latch assembly.

Referring now to FIG. 5, there is illustrated another embodiment of a dual actuator latch apparatus including an inertial latch assembly 60 disposed on one side of the actuator coil frame 34 and an alternative embodiment of an electromagnetic latch assembly 100 disposed on the other side of the actuator coil frame 34. The embodiment of the electromagnetic latch assembly 100 illustrated in FIG. 5 provides reliable actuator 30 restrainment in the presence of relatively low to moderate levels of externally induced actuator accelerations, and is preferably of a sufficiently small size suitable for use in small form factor DASDs.

The electromagnetic latch assembly 100 illustrated in FIG. 5 preferably includes a latch body 101 rotatably mounted to a pivot shaft 108 disposed on the base 22 of the DASD housing 21. The latch body 101 preferably includes a restraining member 102, a latch coil frame 105, and a pivotable magnet support 104. A pair of coil magnets 116 are preferably disposed on the lower and upper magnet assemblies 42 and 40 respectively below and above a latch coil 106 provided on the latch coil frame 105. A pair of release magnets 110 and engagement magnets 114 are preferably disposed on the lower and upper magnet assemblies 42 and 45 of the permanent magnet structure 38 in proximity with a bistable magnet 112 mounted to the pivotable magnet support 104. The separation distance between the pair of release and engagement magnets 110 and 114 preferably define the range within which the pivotable magnet support 104 is permitted to rotate.

In the embodiment illustrated in FIG. 5, the electromagnetic latch assembly 100 is shown in an engaged orientation with respect to the actuator 30. A magnetic coupling force produced between the engagement magnet 114 and the bistable magnet 112 provides a biasing force preferably sufficient in strength to provide secure coupling between the restraining member 102 and a first engagement protrusion 80 disposed on the actuator coil frame 34 in the presence of relatively low to moderate levels of externally induced actuator acceleration. The restraining member 102 is preferably rotated from the engaged orientation to a non-engaged orientation with respect to the first engagement protrusion 80 by delivery of a release current of the proper direction and magnitude in the latch coil 106 in the presence of a magnetic field produced by the pair of coil magnets 116. The latch coil 106 and the pair of coil magnets 116 preferably operate cooperatively as a miniature voice coil motor in a manner similar to that previously described with respect to the actuator coil 36 assembly and permanent magnet structure 38.

Upon delivering the appropriate release current to the latch coil 106, the latch body 101 preferably rotates out of the engaged orientation until the pivotable magnet support 104 contacts the release magnet 110. A magnetic coupling force between the bistable magnet 112 and the release magnet 110 preferably restrains the latch body 101 in the non-engaged orientation, thereby permitting unobstructed operation of the actuator 30. In the presence of a sufficiently strong clockwise rotational shock force applied to the DASD housing 21, unintended rotation of the actuator 30 from the preferred parked orientation is prevented by actuation of the inertial latch assembly 60 in a manner similar to that previously described with respect to FIGS. 3 and 4.

Figure 6:
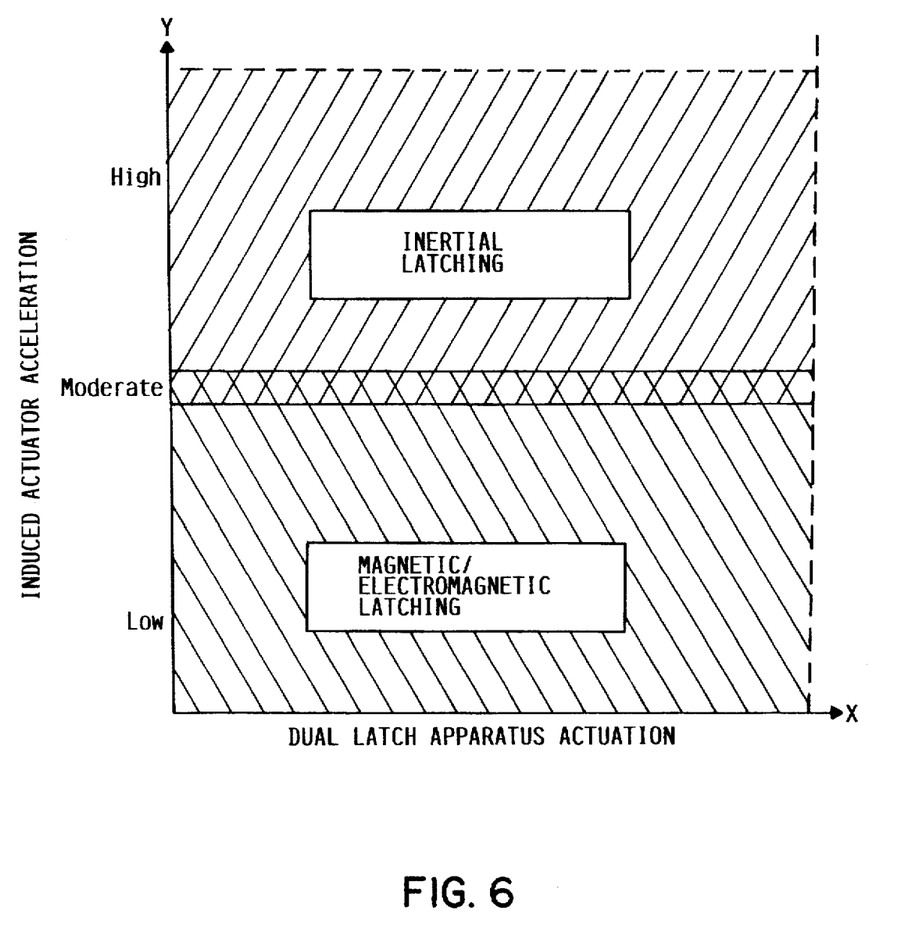
FIG. 6 is a graphical illustration depicting the efficacy of a novel dual actuator latch apparatus in preventing unrestrained actuator movement from a preferred parked orientation in the presence of relatively low, moderate, and high levels of externally induced actuator acceleration.

Turning now to FIG. 6, there is shown a graphical representation depicting the efficacy of the novel dual actuator latch apparatus in the presence of low, moderate, and high levels of externally induced actuator acceleration. Relatively low and moderate levels of externally induced actuator acceleration are preferably compensated for by magnetic or electromagnetic latching of the actuator 32 in accordance with the operation of a novel dual actuator latch apparatus as previously described. As further illustrated in FIG. 6, inertial latching is provided to prevent unrestrained rotation of the actuator 30 out of the parked orientation in the presence of moderately high to high levels of externally induced actuator acceleration. Depending on a number of configuration and dynamic factors, there may exist a transitional range of acceleration levels within which magnetic or electromagnetic latching may be partially initiated concurrently with actuation of inertial latching.

Delayed de-coupling or bouncing between the magnetic/electromagnetic latch assembly and the actuator can result in non-synchronous actuation of the inertial and magnetic/electromagnetic latch assemblies. It is noted that near-instantaneous de-coupling of the magnetic/electromagnetic latch assembly from the actuator coil frame 34 and concurrent actuation of the inertial latch assembly is understood as synchronous actuation between the two disparate latch assemblies. It is generally preferable to minimize the likelihood of any such transitional non-synchronous actuation of the inertial and magnetic/electromagnetic latching assemblies, which may be accomplished by, for example, modifying the appropriate magnetic coupling forces, changing the size, mass, and biasing force of the inertial latch assembly 60, and by locating the inertial and magnetic/electromagnetic latching assemblies within the DASD housing 21 at locations other than those illustrated in the embodiments shown in FIGS. 3–5.

In one embodiment, as illustrated in FIGS. 3 and 4, the inertial latch body 62 includes a curved engagement surface 65 adapted to slidably engage the first engagement protrusion 80 disposed on the actuator coil frame 34 in the event that the inertial latch body 62 begins to rotate toward the actuator latch frame 34 before the magnetic latch assembly 72 or electromagnetic latch assembly 82 has de-coupled with the actuator coil frame 34. The first engagement protrusion 80 preferably slides along the curved engagement surface 65 until it couples with the restraining member 64.

It will, of course, be understood that various modifications and additions can be made to the preferred embodiments discussed hereinabove without departing from the scope or spirit of the present invention. It should be understood, for example, that the novel dual actuator latch apparatus is not limited to use only within DASDs employing magnetic disks, but may be employed in various types of systems to facilitate protection of other data storage mediums, such as CD-ROMs and optical disks, for example, when such systems are subjected to external rotational shock forces. Further, the novel dual actuator latch apparatus may be employed in DASDs of varying configurations, and is not limited to use in small and very small form factor DASDs. Also, varying configurations of the inertial and magnetic/electromagnetic latch assemblies come within the scope of the present invention. Accordingly, the scope of the present invention should not be limited by the particular embodiments discussed above, but should be defined only by the claims set forth below and equivalents thereof.

What is claimed is:

1. A dual latch apparatus adapted for restraining an actuator rotatably mounted to a housing of a DASD to prevent unintended contact between the actuator and a data storage disk disposed within the housing, the dual latch apparatus comprising:

a first latch assembly, comprising:

a latch body rotatably mounted to the housing;

a restraining member coupled to the latch body, the restraining member engaging the actuator for restraining the actuator at a parking location in response to an external shock force applied to the housing; and bias means, coupled to the latch body, for biasing the restraining member in a non-engaged relationship with respect to the actuator in the absence of the external shock force; and a second latch assembly, comprising:

a magnet assembly mounted to the housing; and an actuator stop surface disposed on the actuator for magnetically interacting with the magnet assembly to restrain the actuator at the parking location in response to the external shock force.

2. An apparatus as claimed in claim 1, wherein the second latch assembly further comprises a magnet assembly stop for providing a constant clearance distance between the magnet assembly and the actuator stop surface when the actuator is restrained at the parking location.

3. An apparatus as claimed in claim 1, wherein the restraining member includes a curved engagement surface for providing slidable engagement between the restraining member and the actuator prior to coupling between the restraining member and the actuator.

4. An apparatus as claimed in claim 1, wherein the magnet assembly of the second latch assembly comprises a permanent magnet structure for magnetically interacting cooperatively with a coil assembly disposed on the actuator as a voice coil motor.

5. An apparatus as claimed in claim 1, wherein the actuator stop surface comprises magnetically permeable material that magnetically interacts with the magnet assembly of the second latch assembly.

6. An apparatus as claimed in claim 1, wherein:

the parking location comprises an outer diameter landing zone, and the actuator includes an actuator arm extending over at least a portion of the data storage disk; and a portion of the actuator arm is restrained proximate the outer diameter landing zone when the actuator is restrained at the parking location.

7. An apparatus as claimed in claim 1, wherein:

the parking location comprises a load/unload ramp disposed in the housing proximate an outer periphery of the data storage disk, and the actuator includes an actuator arm extending over at least a portion of the data storage disk; and a portion of the actuator arm is in contact with the load/unload ramp when the actuator is restrained at the parking location.

8. An apparatus as claimed in claim 1, wherein:

a permanent magnet structure is disposed in the housing for magnetically interacting cooperatively with the actuator as a voice coil motor;

the actuator comprises:

an actuator arm extending over at least a portion of the data storage disk; and a back portion proximate the permanent magnet structure, the back portion respectively including a first side and a second side;

a restraining protrusion is disposed on the first side for engaging the restraining member; and the actuator stop surface is disposed on the second side for magnetically interacting with the magnet assembly of the second latch assembly.

9. An apparatus as claimed in claim 1, wherein:

the parking location comprises an inner diameter landing zone, and the actuator includes an actuator arm extending over at least a portion of the data storage disk; and a portion of the actuator arm is restrained proximate the inner landing zone when the actuator is restrained at the parking location.

10. A direct access storage device for storing data comprising:

a housing;

a data storage disk;

a spindle motor mounted to the housing and adapted for rotating the data storage disk;

an actuator rotatably mounted to the housing;

a transducer head mounted to the actuator; and a dual latch apparatus comprising:

a latch body rotatably mounted to the housing;

a restraining member coupled to the latch body, the restraining member engaging the actuator for restraining the actuator at a parking location in response to an external shock force applied to the housing; and bias means, coupled to the latch body, for biasing the restraining member in a non-engaged relationship with respect to the actuator in the absence of the external shock force; and a second latch assembly, comprising:

a magnet assembly mounted to the housing; and an actuator stop surface disposed on the actuator for magnetically interacting with the magnet assembly to restrain the actuator at the parking location in response to the external shock force.

11. An apparatus as claimed in claim 10, wherein the second latch assembly further comprises a magnet assembly stop for providing a constant clearance distance between the magnet assembly and the actuator stop surface when the actuator is restrained at the parking location.

12. An apparatus as claimed in claim 10, further comprising a permanent magnet structure for magnetically interacting cooperatively with a coil assembly disposed on the actuator as a voice coil motor, wherein the magnet assembly of the second latch assembly comprises the permanent magnet structure.

13. An apparatus as claimed in claim 10, wherein:

the parking location comprises an outer diameter landing zone and the actuator includes an actuator arm extending over at least a portion of the data storage disk; and a portion of the actuator arm is restrained proximate the outer diameter landing zone when the actuator is restrained at the parking location.

14. An apparatus as claimed in claim 10, wherein:

the parking location comprises a load/unload ramp disposed in the housing proximate an outer periphery of the data storage disk, and the actuator includes an actuator arm extending over at least a portion of the data storage disk; and a portion of the actuator arm is in contact with the load/unload ramp when the actuator is restrained at the parking location.

15. An apparatus as claimed in claim 10, wherein:

the parking location comprises an inner diameter landing zone, and the actuator includes an actuator arm extending over at least a portion of the data storage disk; and a portion of the actuator arm is restrained proximate the inner landing zone when the actuator is restrained at the parking location.

* * * * *